(12) United States Patent
Liu et al.

(10) Patent No.: US 11,620,526 B2
(45) Date of Patent: Apr. 4, 2023

(54) SENSITIVITY CLASSIFICATION NEURAL NETWORK

(71) Applicant: Microsoft Technology Licensing, LLC, Redmond, WA (US)

(72) Inventors: Bo Liu, Sammamish, WA (US); Ke Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/818,811

(22) Filed: Aug. 10, 2022

(65) Prior Publication Data
US 2022/0383124 A1 Dec. 1, 2022

Related U.S. Application Data

(63) Continuation of application No. 16/398,055, filed on Apr. 29, 2019, now Pat. No. 11,449,755.

(51) Int. Cl.
*G06N 3/08* (2006.01)
*G06K 9/62* (2022.01)
*G06N 3/082* (2023.01)

(52) U.S. Cl.
CPC ............ *G06N 3/082* (2013.01); *G06K 9/6256* (2013.01); *G06K 9/6267* (2013.01)

(58) Field of Classification Search
CPC ........ G06N 20/00; G06N 3/084; G06N 7/005; G06N 3/04; G06N 3/0445; G06N 3/0454; G06N 3/063; G06N 3/08; G06N 3/082; G06N 5/04; G06N 3/0427; G06F 21/6245; G06F 21/60; G06F 16/285; G06F 16/35; G06F 21/552; G06F 21/6227; G06K 9/6256; G06K 9/6267; H04L 63/105
See application file for complete search history.

(56) References Cited

U.S. PATENT DOCUMENTS

| | | | |
|---|---|---|---|
| 10,095,992 B1* | 10/2018 | Brestoff | G06N 3/04 |
| 10,333,901 B1* | 6/2019 | Bauman | H04L 63/20 |
| 10,430,605 B1* | 10/2019 | Nerurkar | G06F 16/24535 |
| 10,810,317 B2* | 10/2020 | Williamson | G06F 16/285 |
| 10,832,166 B2* | 11/2020 | Bhatt | G06K 9/6256 |
| 10,979,461 B1* | 4/2021 | Cervantez | H04L 63/105 |
| 11,249,964 B2* | 2/2022 | Dhaygude | G06F 9/547 |

(Continued)

*Primary Examiner* — Michael S Osinski
(74) *Attorney, Agent, or Firm* — Alleman Hall Creasman & Tuttle LLP

(57) ABSTRACT

A computing device, including a processor configured to receive a training data set including a first plurality of log entries. Each log entry of the first plurality of log entries may be associated with a tag indicating whether the log entry includes sensitive data. The processor may be further configured to train a sensitivity classification neural network using the training data set. The processor may be further configured to apply the sensitivity classification neural network to a test data set including a second plurality of log entries to obtain a first classified test data set. The processor may be further configured to apply a rule-based data sensitivity classification algorithm to the test data set to obtain a second classified test data set. Based on the first classified test data set and the second classified test data set, the processor may be further configured to modify the sensitivity classification neural network.

20 Claims, 7 Drawing Sheets

(56) References Cited

U.S. PATENT DOCUMENTS

| | | | |
|---|---|---|---|
| 2012/0303558 A1* | 11/2012 | Jaiswal | G06N 20/00 706/12 |
| 2014/0047551 A1* | 2/2014 | Nagasundaram | H04L 63/107 726/26 |
| 2015/0242639 A1* | 8/2015 | Galil | G06F 21/60 726/1 |
| 2016/0283735 A1* | 9/2016 | Wang | G06F 21/6254 |
| 2017/0011185 A1* | 1/2017 | Schweizer | G16H 30/40 |
| 2017/0372226 A1* | 12/2017 | Costa | G06F 21/6245 |
| 2018/0262482 A1* | 9/2018 | Liu | H04L 63/083 |
| 2019/0005020 A1* | 1/2019 | Gregory | G06V 10/457 |
| 2019/0163985 A1* | 5/2019 | Wang | G06Q 30/00 |
| 2020/0314117 A1* | 10/2020 | Nguyen | G06F 21/552 |
| 2020/0349271 A1* | 11/2020 | Binkley | G06F 21/6245 |
| 2021/0209247 A1* | 7/2021 | Mohassel | A63B 21/222 |
| 2021/0224567 A1* | 7/2021 | Wang | G06V 20/52 |
| 2021/0248263 A1* | 8/2021 | van Liesdonk | H04L 9/008 |
| 2022/0092216 A1* | 3/2022 | Mohassel | G06N 3/084 |

\* cited by examiner

SENSITIVITY CLASSIFICATION NEURAL NETWORK

CROSS REFERENCE TO RELATED APPLICATIONS

This application is a continuation of U.S. patent application Ser. No. 16/398,055, filed Apr. 29, 2019, the entirety of which is hereby incorporated herein by reference for all purposes.

BACKGROUND

End user data stored in cloud computing environments is frequently subject to regulatory or contractual restrictions regarding data privacy. However, when performing offline processing of data stored in a computing environment that is compliant with a data contract or regulation, some of the stored data may be transferred to another computing environment that is not compliant with the data contract or regulation.

SUMMARY

According to one aspect of the present disclosure, a computing device is provided, including a processor configured to receive a training data set including a first plurality of log entries. Each log entry of the first plurality of log entries may be associated with a tag indicating whether the log entry includes sensitive data. The processor may be further configured to train a sensitivity classification neural network using the training data set. The processor may be further configured to apply the sensitivity classification neural network to a test data set including a second plurality of log entries to obtain a first classified test data set. The processor may be further configured to apply a rule-based data sensitivity classification algorithm to the test data set to obtain a second classified test data set. Based on the first classified test data set and the second classified test data set, the processor may be further configured to modify the sensitivity classification neural network to obtain a first modified sensitivity classification neural network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Existing systems and methods for removing sensitive data from sets of data that are transferred from compliant environments to non-compliant environments may experience the following technical challenges. According to existing systems and methods, rule-based scrubbers are applied to the sets of data selected for transfer. A rule-based scrubber identifies a pattern in the data that matches a sensitive data format, such as a government-issued identification number (i.e., a Social Security number) or a private key. Strings that match the one or more patterns specified in the rule-based scrubber are excluded from the data that is transferred to the non-compliant environment. Some examples of rules that may be used in rule-based scrubbers are provided below:

```
<Processor FieldName="CustomProperties">
  <Parser Type="NameValueString" NameValueDelimiter="=" PairDelimiter="&">
    <Processor FieldName="ClientIP">
    <!--Ipv4-->
    <Parser Type="Ipv4AddressString">
       <Processor
          ReplacementStrategy="HashEncryptAndGeolocation" FieldName="FullAddress" />
    </Parser>
    </Processor>
    <Processor FieldName="UserName">
    <!--Email address-->
    <Parser Type="SmtpAddressString">
       <Processor ReplacementStrategy="HashAndEncrypt" FieldName="LocalPart"/>
    </Parser>
    </Processor>
  </Parser>
```

In these examples, the rule-based scrubber identifies sensitive data including an IPv4 address string and/or an SMTP address string and replaces such strings with hashed and encrypted versions of the strings.

However, rule-based scrubbers as described above can only recognize sensitive data that matches the one or more rules. In some scenarios, sensitive data may be included in the data in an unstructured format that does not match any of the formats recognized by the rule-based scrubber. In such scenarios, sensitive data may be missed by the rule-based scrubber and transferred to the non-compliant environment. Some types of sensitive data, such as trade secrets and export-controlled data, may be especially likely to occur in unstructured form.

Figure 1:
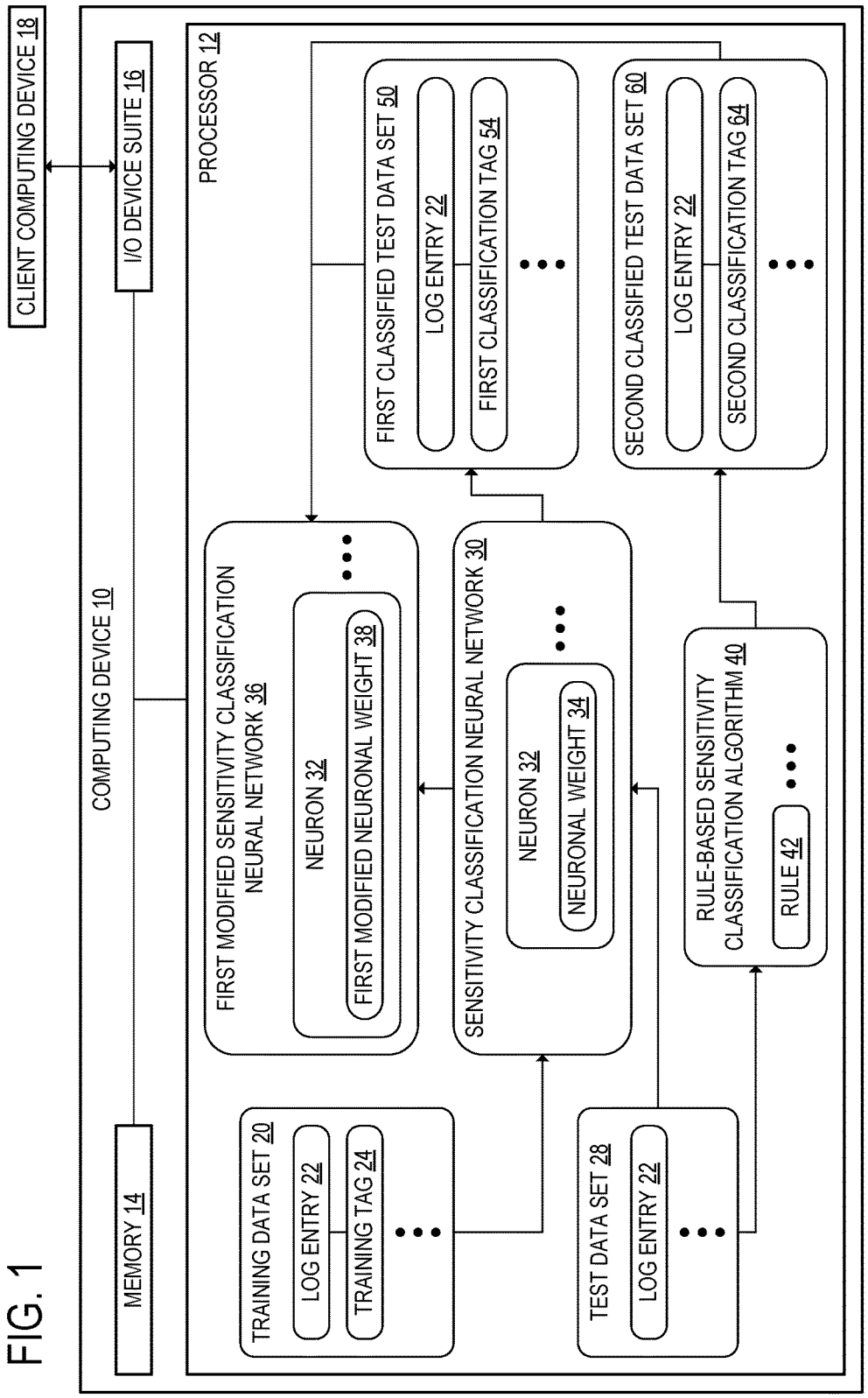
FIG. 1 schematically shows an example computing device during training and testing of a sensitivity classification neural network, according to one embodiment of the present disclosure.

In order to address at least one of the issues discussed above, the following systems and methods are provided. FIG. 1 shows an example computing device 10, according to one embodiment of the present disclosure. The computing device 10 may include a processor 12 and may further include memory 14 operatively coupled to the processor 12. The computing device 10 may further include an input/output device suite 16 including one or more input devices and/or output devices. The input/output device suite 16 may be operatively coupled to the processor 12 and/or the memory 14. In some embodiments, the computing device 10 may be configured to communicate with one or more other computing devices via one or more communication devices included in the input/output device suite 16. For example, the computing device 10 may be a server computing device configured to communicate with one or more client computing devices 18. Additionally or alternatively, functions of the computing device 10 and its components may be distributed across a plurality of physical computing devices operatively coupled via the one or more communication devices.

In the example of FIG. 1, the computing device 10 is shown during training of a sensitivity classification neural network 30 that may be used to detect sensitive data. The processor 12 of the computing device 10 may be configured to receive a training data set 20 including a first plurality of log entries 22. In some embodiments, the first plurality of log entries 22 may be received from one or more client computing devices 18. Thus, in such embodiments, the training data set 20 may be constructed from a sample of end user data. The first plurality of log entries 22 may indicate one or more user interactions—some of which may involve exchanging, processing, and/or storing sensitive data—performed with the computing device 10. Thus, the first plurality of log entries 22 may include a mix of sensitive and non-sensitive data. The first plurality of log entries 22 may indicate one or more user interactions performed with a first computing environment, as which is discussed in further detail below.

Each of the log entries 22 included in the training data set 20 may be associated with a training tag 24 indicating whether the log entry 22 includes sensitive data. The training tag 24 may be provided by a user supervising the training of the sensitivity classification neural network 30. In some embodiments, other metadata may also be associated with the plurality of log entries 22, such as a plurality of timestamps of the respective plurality of log entries 22.

The processor 12 may be further configured to train the sensitivity classification neural network 30 using the training data set 20. Training the sensitivity classification neural network may include setting a plurality of neuronal weights 34 of a respective plurality of neurons 32 included in the sensitivity classification neural network 30. In some embodiments, the sensitivity classification neural network 30 may be a deep neural network in which the plurality of neurons 32 are arranged in a plurality of layers.

The processor 12 may be further configured to apply the sensitivity classification neural network 30 to a test data set 28, which may include a second plurality of log entries 22. The second plurality of log entries 22 may indicate a plurality of user interactions with a first computing environment, similarly to the first plurality of log entries 22. By applying the sensitivity classification neural network 30 to the test data set 28, the processor 12 may obtain a first classified test data set 50. The first classified test data set 50 may include the second plurality of log entries 22 and a respective plurality of first classification tags 54. Each first classification tag 54 may indicate whether the log entry 22 associated with that first classification tag 54 has been classified as sensitive.

Similarly to the first plurality of log entries 22, the second plurality of log entries 22 included in the test data set 28 may be received from the one or more client computing devices 18. Thus, the sensitivity classification neural network 30 may be tested using a sample of end-user data. Training and/or testing the sensitivity classification neural network 30 using example end-user data may allow the sensitivity classification neural network 30 to provide more accurate classification results at runtime.

In addition to testing the sensitivity classification neural network 30 with the test data set 28, the processor 12 may be further configured to apply a rule-based data sensitivity classification algorithm 40 to the test data set 28 to obtain a second classified test data set 60. The rule-based sensitivity classification algorithm 40 may include one or more rules 42 that each identify one or more data formats as sensitive. For example, the rule-based sensitivity classification algorithm 40 may include a rule 42 that log entries 22 including strings marked as passwords are sensitive. The second classified test data set 60 may include the second plurality of log entries 22 and a respective plurality of second classification tags 64. Each second classification tag 64 may indicate whether the log entry 22 associated with that second classification tag 64 has been classified as sensitive.

Based on the first classified test data set 50 and the second classified test data set 60, the processor 12 may be further configured to modify the sensitivity classification neural network 30 to obtain a first modified sensitivity classification neural network 36. In some embodiments, the sensitivity classification neural network 30 may be modified at least in part by modifying one or more neuronal weights 34 of one or more respective neurons 32 to obtain one or more respective first modified neuronal weights 38.

Figure 2:
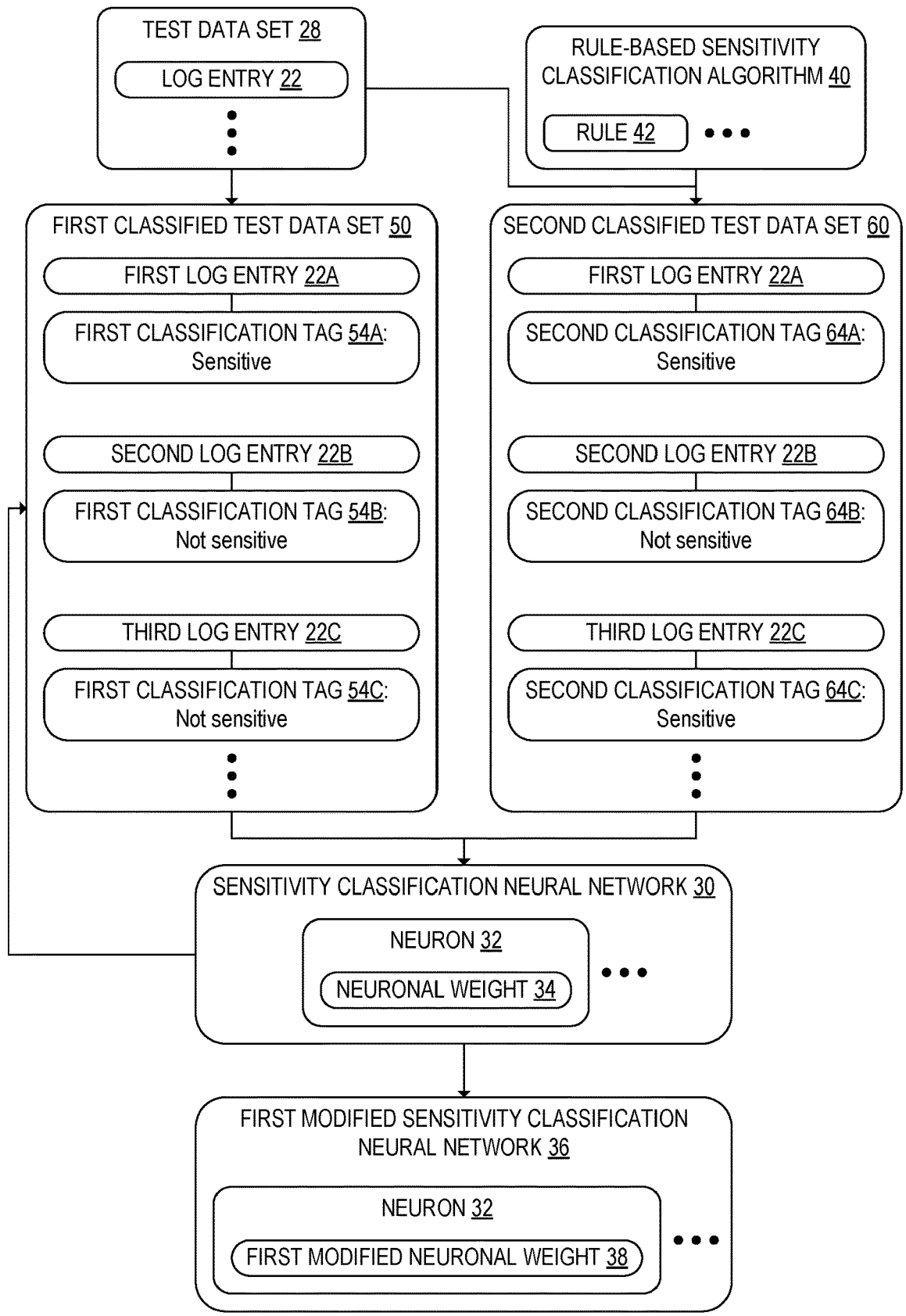
FIG. 2 shows an example of modification of the sensitivity classification neural network, according to the example of FIG. 1.

FIG. 2 shows an example of modification of the sensitivity classification neural network 30 based on the first classified test data set 50 and the second classified test data set 60. FIG. 2 shows a first log entry 22A, a second log entry 22B, and a third log entry 22C that are included in both the first classified test data set 50 and the second classified test data set 60. The first log entry 22A is associated with a first classification tag 54A in the first classified test data set 50 and a second classification tag 64A in the second classified test data set 60, both of which indicate that the first log entry 22A is sensitive. The second log entry 22B is associated with a first classification tag 54B in the first classified test data set 50 and a second classification tag 64B in the second classified test data set 60, both of which indicate that the second log entry 22B is not sensitive. The third log entry 22C is associated with a first classification tag 54C in the first classified test data set 50 and a second classification tag 64C in the second classified test data set 60. However, the first classification tag 54C indicates that the third log entry 22C is not sensitive, whereas the second classification tag 64C indicates that the third log entry 22C is sensitive.

In some embodiments, the processor 12 may be configured to modify the sensitivity classification neural network 30 at least in part by identifying one or more log entries 22 of the test data set 28 that are marked as including sensitive data in the second classified test data 60 set but not in the first classified test data set 50. In the example of FIG. 2, the third log entry 22C satisfies this condition. Since false negatives are typically more detrimental than false positives when detecting sensitive data, the processor 12 may be configured to modify the sensitivity classification neural network such that the first modified sensitivity classification neural network 36 identifies such log entries 22 as sensitive. Thus, the sensitivity classification neural network 30 may be tuned such that it detects as sensitive any log entries 22 in the test data set 28 that are marked as sensitive by the rule-based sensitivity classification algorithm 40.

Figure 3:
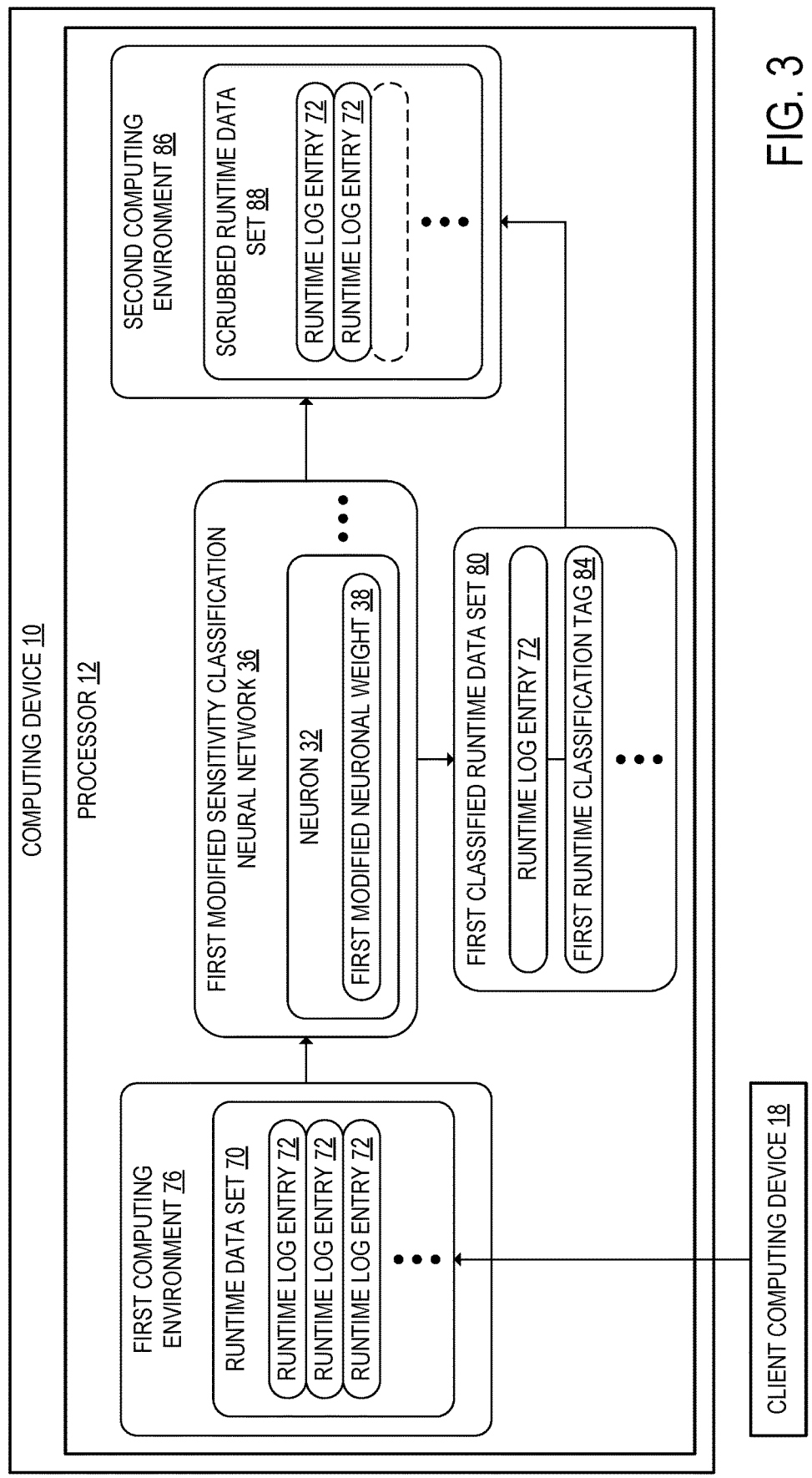
FIG. 3 shows an example of the classification of a runtime data set, according to the example of FIG. 1.

Subsequently to initial training of the sensitivity classification neural network, the processor 12 may be further configured to receive a runtime data set 70, as shown in FIG. 3. The runtime data set 70 may include one or more runtime log entries 72, which may be end user data received from one or more client computing devices 18. The processor 12 may be further configured to classify the runtime data set 70 using the first modified sensitivity classification neural network 36 to obtain a first classified runtime data set 80. The first classified runtime data set 80 may include the plurality of runtime log entries 72 along with a respective plurality of first runtime classification tags 84 that indicate whether their respective runtime log entries 72 include sensitive data. As shown in the example of FIG. 3, the processor 12 may be further configured to remove one or more runtime log entries 72 classified as including sensitive data from the first classified runtime data set 80 to obtain a scrubbed runtime data set 88.

In some embodiments, as shown in FIG. 3, the processor 12 may be configured to classify the runtime data set 70 in response to receiving an instruction to move the runtime data set 70 from a first computing environment 76 to a second computing environment 86. For example, the first computing environment 76 may be a computing environment that is compliant with a contract or regulation, whereas the second computing environment 86 may be a non-compliant environment. Each of the first computing environment 76 and the second computing environment 86 may include one or more computing devices, which may be server computing devices. Alternatively, the first computing environment 76 and the second computing environment may be instantiated in a single computing device, as shown in FIG. 3. In embodiments in which the processor 12 receives instructions to move the runtime data set 70 from a first computing environment 76 to a second computing environment 86, at least some of the plurality of runtime log entries 72 may indicate one or more user interactions performed with the first computing environment 76.

In embodiments in which the processor 12 is configured to classify the runtime data set 70 in response to receiving an instruction to transfer the runtime data set 70 to the second computing environment 86, the processor 12 may be further configured to transfer the first classified runtime data set 80 to the second computing environment 86 subsequently to removing the one or more runtime log entries 72 classified as including sensitive data from the runtime data set 70. Thus, the processor 12 may be configured to transfer the scrubbed runtime data set 88 to the second computing environment 86.

Figure 4:
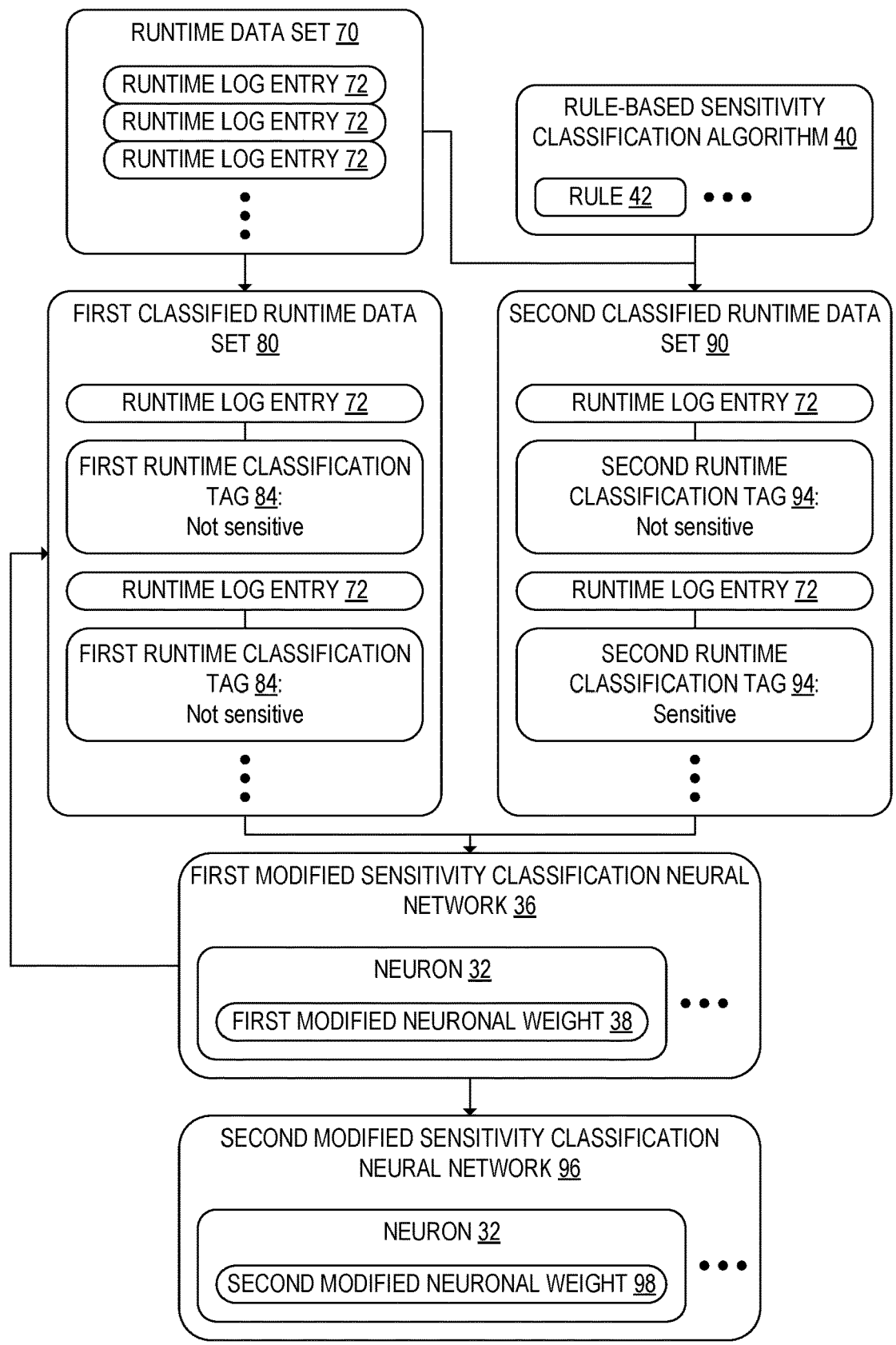
FIG. 4 shows an example of further modification of a first modified sensitivity classification neural network, according to the example of FIG. 1.

In some embodiments, the runtime data set 70 may be used to further tune the first modified sensitivity classification neural network 36, as shown in the example of FIG. 4. As shown in FIG. 4, the processor 12 may be further configured to apply the rule-based sensitivity classification algorithm 40 to the one or more runtime log entries 72 to obtain a second classified runtime data set 90. The second classified runtime data set 90 may include the plurality of runtime log entries 72 included in the runtime data set 70. The second classified runtime data set 90 may further include a plurality of second runtime classification tags 94 respectively associated with the plurality of runtime log entries 72.

Based on the first classified runtime data set 80 and the second classified runtime data set 90, the processor 12 may be further configured to further modify the first modified sensitivity classification neural network 36 to obtain a second modified sensitivity classification neural network 96. In the example of FIG. 4, the processor 12 may further modify the first modified sensitivity classification neural network 36 at least in part by identifying one or more runtime log entries 72 that are classified as including sensitive data by the rule-based sensitivity classification algorithm 40 but not by the first modified sensitivity classification neural network 36. The processor 12 may be configured to change one or more of the first modified neuronal weights 38 of the first modified sensitivity classification neural network 36 to one or more second modified neuronal weights 98. Additionally or alternatively, the processor 12 may change one or more neuronal weights 34 that were not changed when the sensitivity classification neural network 30 was modified to obtain the first modified sensitivity classification neural network 36.

Thus, the processor 12 may further modify the first modifies sensitivity classification neural network 36 similarly to how it tunes the sensitivity classification neural network 30. In the example of FIG. 4, the runtime data set 70 is used as an additional training data set with which the first modified sensitivity classification neural network 36 may be updated in order to recognize a wider range of types of sensitive data.

Figure 5:
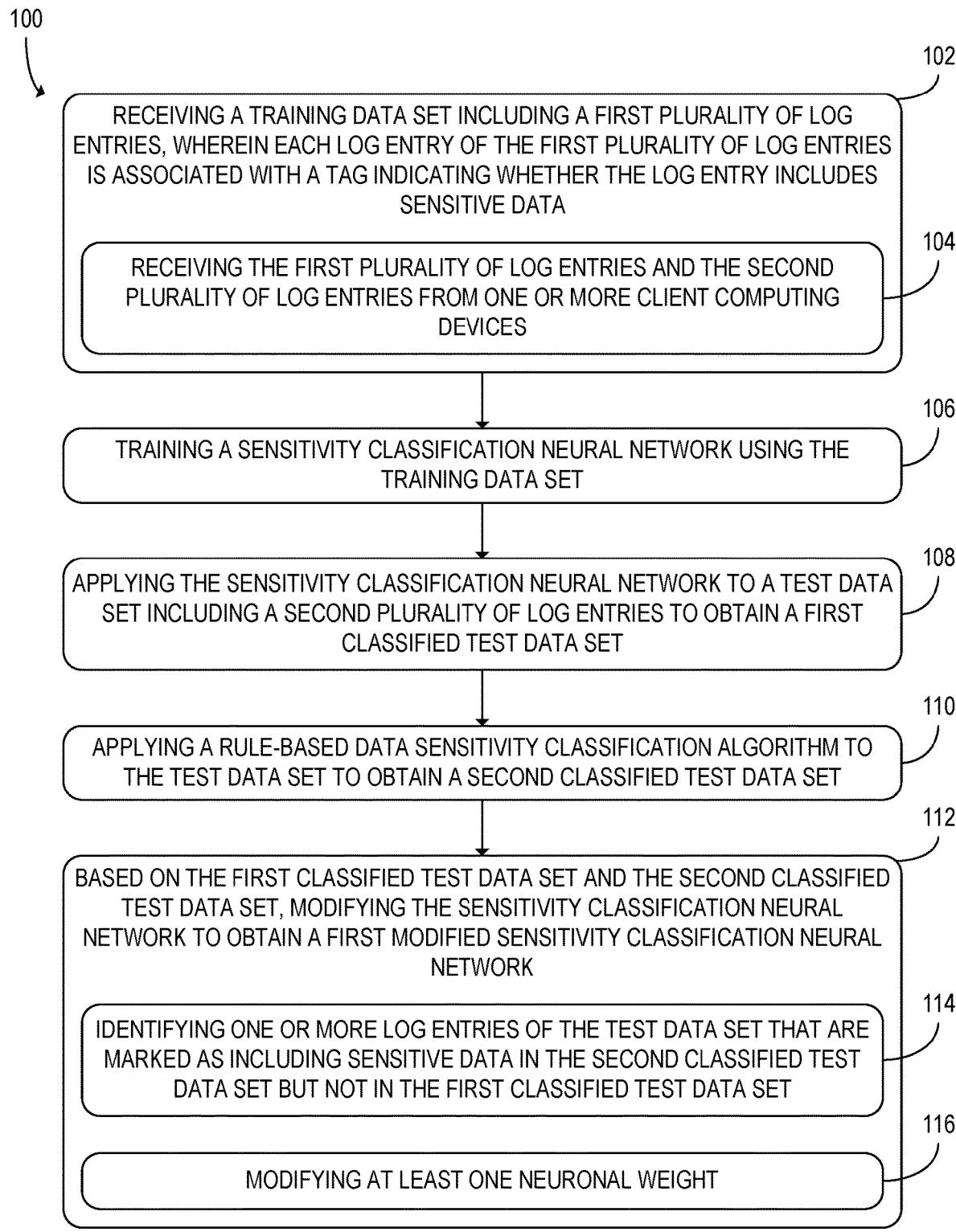
FIG. 5 shows a flowchart of a method of training a sensitivity classification neural network, according to the example of FIG. 1.

FIG. 5 shows a flowchart of a method 100 that may be used with a server computing device to train a sensitivity classification neural network. The server computing device may be the server computing device 10 of FIG. 1 in some embodiments. At step 102, the method 100 may include receiving a training data set including a first plurality of log entries. Each log entry of the first plurality of log entries may be associated with a training tag indicating whether the log entry includes sensitive data. The plurality of training tags may be provided by a user supervising the training of the sensitivity classification neural network. In some embodiments, at step 104, step 102 may include receiving the first plurality of log entries and the second plurality of log entries from one or more client computing devices. In such embodiments, the first plurality of log entries may indicate one or more user interactions performed with a first computing environment. The first computing environment may be a compliant computing environment that complies with a contract or regulation related to data privacy or secrecy.

At step 106, the method 100 may further include training a sensitivity classification neural network using the training data set. Thus, the sensitivity classification neural network may be trained to classify log entries by matching tags to log entries that indicate whether those log entries include sensitive data. The sensitivity classification neural network may be a deep neural network in some embodiments.

At step 108, the method 100 may further include applying the sensitivity classification neural network to a test data set including a second plurality of log entries to obtain a first classified test data set. Similarly to the training data set, the second plurality of log entries included in the test data set may be received from one or more client computing devices and may indicate one or more user interactions performed with a first computing environment. The first classified test data set may include the second plurality of log entries and a respective plurality of first classification tags that indicate whether the log entries include sensitive data.

At step 110, the method 100 may further include applying a rule-based data sensitivity classification algorithm to the test data set to obtain a second classified test data set. The second classified test data set may include the second plurality of log entries and a respective plurality of second classification tags that indicate whether the log entries include sensitive data. Thus, the second plurality of log entries included in the test data set may be classified by both the sensitivity classification neural network and the rule-based sensitivity classification algorithm.

At step 112, the method 100 may further include modifying the sensitivity classification neural network based on the first classified test data set and the second classified test data set to obtain a first modified sensitivity classification neural network. In some embodiments, step 112 may include, at step 114, identifying one or more log entries of the test data set that are marked as including sensitive data in the second classified test data set but not in the first classified test data set. Thus, log entries that are identified as sensitive by the rule-based sensitivity classification algorithm but not by the sensitivity classification neural network may be identified. The sensitivity classification neural network may be modified to identify such log entries as sensitive. Additionally or alternatively, at step 116, modifying the sensitivity classification neural network includes modifying at least one neuronal weight of the sensitivity classification neural network. For example, when the sensitivity classification neural network is a deep neural network, modifying the sensitivity classification neural network may include modifying a respective neuronal weight of at least one neuron located in an inner layer of the deep neural network.

Figure 6:
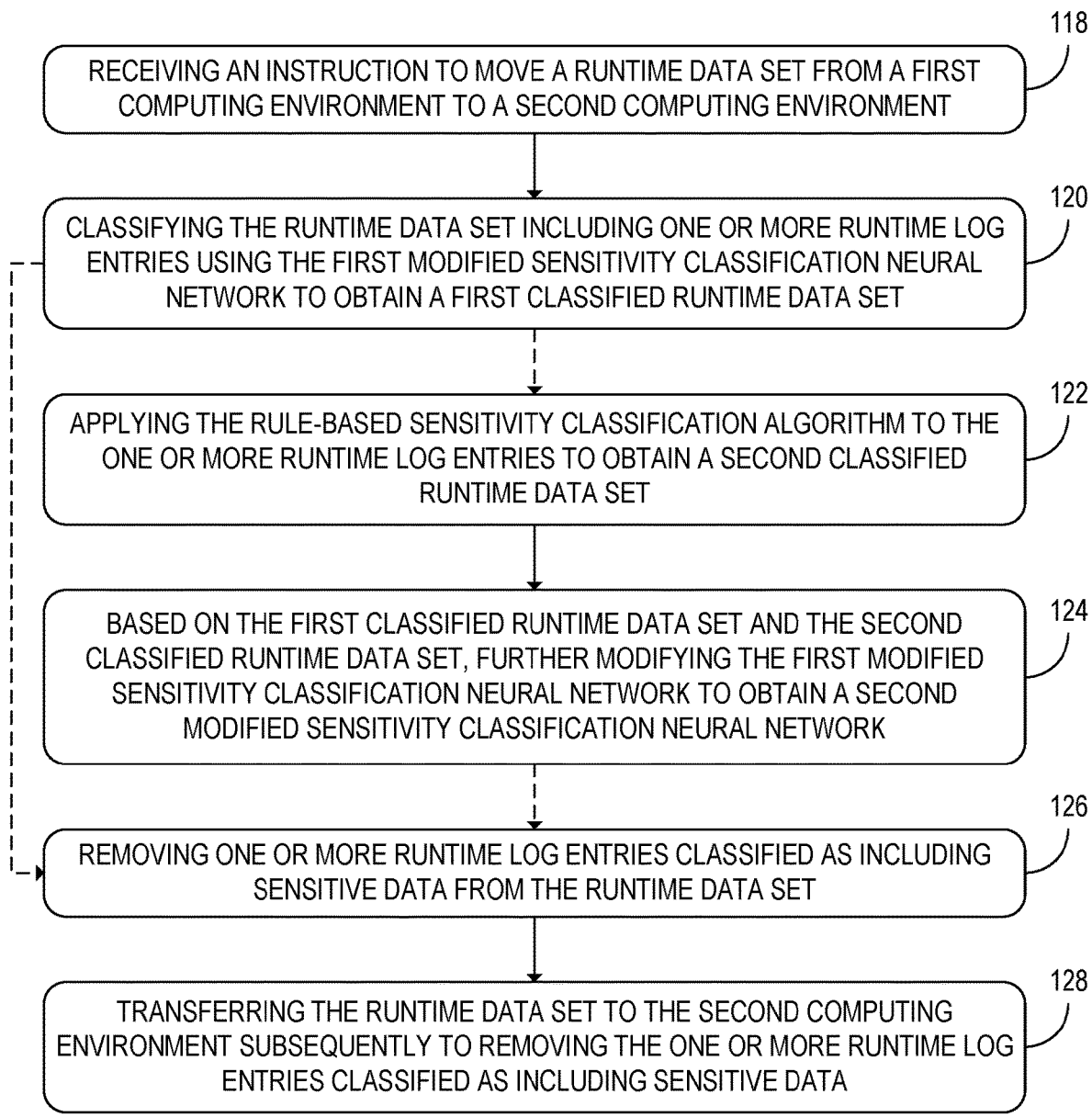
FIG. 6 shows additional steps of the method of FIG. 5 that may be performed at runtime subsequently to performing the steps illustrated in FIG. 5.

FIG. 6 shows additional steps that may be performed subsequently to training the sensitivity classification neural network. The steps shown in FIG. 6 may be performed at runtime. At step 118, the method 100 may further include receiving an instruction to move a runtime data set from a first computing environment to a second computing environment. The runtime data set may include one or more runtime log entries. In embodiments in which step 118 is performed, the first computing environment may be a compliant computing environment and the second computing environment may be a non-compliant computing environment.

At step 120, the method 100 may further include classifying the runtime data set using the first modified sensitivity classification neural network to obtain a first classified runtime data set. The first classified runtime data set may include the plurality of runtime log entries and a respective plurality of first runtime classification tags. At step 122, in embodiments in which step 120 is performed, the method 100 may further include applying the rule-based sensitivity classification algorithm to the one or more runtime log entries to obtain a second classified runtime data set. Similarly to the first classified runtime data set, the second classified runtime data set may include the plurality of runtime log entries and a respective plurality of second runtime classification tags. At step 124, the method 100 may further include, based on the first classified runtime data set and the second classified runtime data set, further modifying the first modified sensitivity classification neural network to obtain a second modified sensitivity classification neural network. The further modification may use the runtime data set as an additional test data set such that the first modified sensitivity classification neural network is modified to detect as sensitive each runtime log entry that is detected as sensitive by the rule-based sensitivity classification algorithm.

Additionally or alternatively, at step 126, the method 100 may further include removing one or more runtime log entries classified as including sensitive data from the first classified runtime data set. In this way, a scrubbed runtime data set may be generated from the runtime data set. At step 128, the method 100 may further include transferring the first classified runtime data set to the second computing environment subsequently to removing the one or more runtime log entries classified as including sensitive data. Thus, the runtime data set may be moved without compromising the security of the sensitive data.

In one example use case scenario, a runtime log entry includes a field in which a chat message is stored. Since chat messages are unstructured data that does not typically fit any predefined pattern, existing rule-based sensitivity classification algorithms will typically fail to recognize the chat messages as sensitive data. In contrast, a neural network may be trained to recognize chat logs as sensitive if sample chat logs are included in the training data set and tagged as sensitive. Thus, the neural-network-based approaches described above may allow for sensitive data that would be missed by traditional rule-based approaches to be correctly identified as sensitive.

In another example use case scenario, the training data may have a keyword that frequently appears in log entries that are classified as sensitive by the rule-based sensitivity classification algorithm. For example, the keyword may be a username that is part of an SMTP address. In this example, the rule-based sensitivity classification algorithm may mark lists of email recipients as sensitive. The username may therefore occur frequently in log entries that are marked sensitive. When the sensitivity classification neural network is trained with such log entries, the sensitivity classification neural network may learn that log entries including the username are likely to be sensitive, even when those log entries are not lists of email recipients. Thus, by recognizing the username, the sensitivity classification neural network may classify log entries as sensitive that are likely to include sensitive data but would not be classified as sensitive by the rule-based sensitivity classification algorithm.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
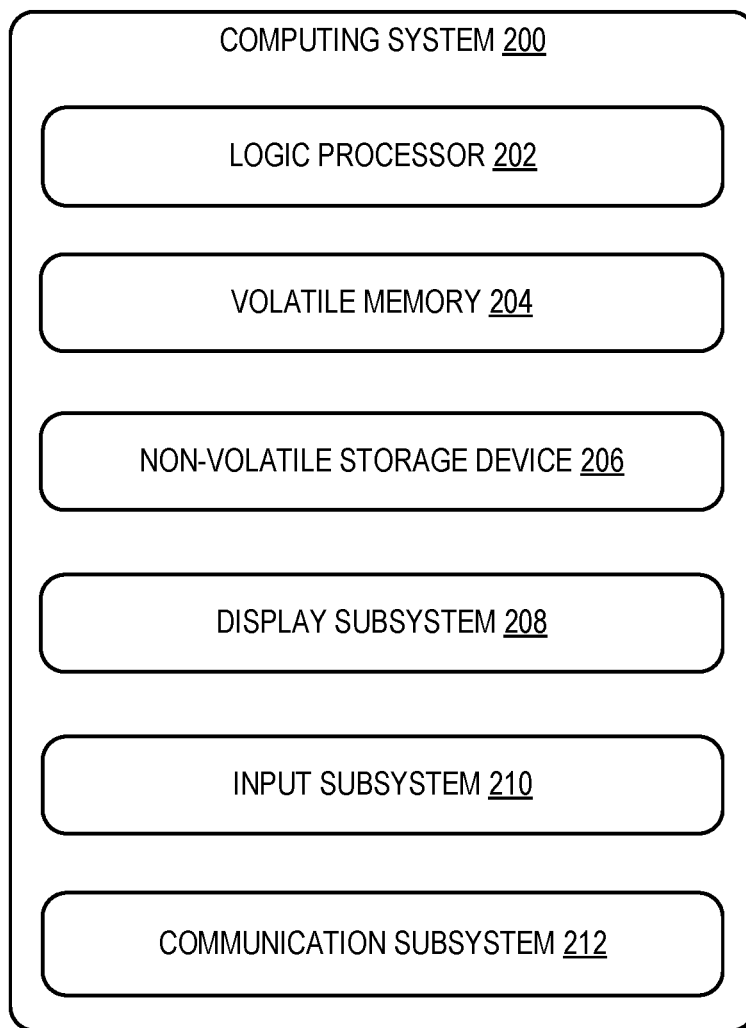
FIG. 7 shows a schematic view of an example computing environment in which the computer device of FIG. 1 may be enacted.

FIG. 7 schematically shows a non-limiting embodiment of a computing system 200 that can enact one or more of the methods and processes described above. Computing system 200 is shown in simplified form. Computing system 200 may embody the server computing device 10 described above and illustrated in FIG. 1. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

According to one aspect of the present disclosure, a computing device is provided, including a processor configured to receive a training data set including a first plurality of log entries. Each log entry of the first plurality of log entries may be associated with a training tag indicating whether the log entry includes sensitive data. The processor may be further configured to train a sensitivity classification neural network using the training data set. The processor may be further configured to apply the sensitivity classification neural network to a test data set including a second plurality of log entries to obtain a first classified test data set. The processor may be further configured to apply a rule-based data sensitivity classification algorithm to the test data set to obtain a second classified test data set. Based on the first classified test data set and the second classified test data set, the processor may be further configured to modify the sensitivity classification neural network to obtain a first modified sensitivity classification neural network.

According to this aspect, the processor may be further configured to classify a runtime data set including one or more runtime log entries using the first modified sensitivity classification neural network to obtain a first classified runtime data set.

According to this aspect, the processor may be further configured to apply the rule-based sensitivity classification algorithm to the one or more runtime log entries to obtain a second classified runtime data set. Based on the first classified runtime data set and the second classified runtime data set, the processor may be further configured to further modify the first modified sensitivity classification neural network to obtain a second modified sensitivity classification neural network.

According to this aspect, the processor may be further configured to remove one or more runtime log entries classified as including sensitive data from the first classified runtime data set.

According to this aspect, the processor may be configured to classify the runtime data set in response to receiving an instruction to move the runtime data set from a first computing environment to a second computing environment. The processor may be further configured to transfer the first classified runtime data set to the second computing environment subsequently to removing the one or more runtime log entries classified as including sensitive data.

According to this aspect, the processor may be configured to modify the sensitivity classification neural network at least in part by identifying one or more log entries of the test data set that are marked as including sensitive data in the second classified test data set but not in the first classified test data set.

According to this aspect, the sensitivity classification neural network may be a deep neural network. The processor may be configured to modify the sensitivity classification neural network at least in part by modifying at least one neuronal weight of the deep neural network.

According to this aspect, the first classified test data set may include the second plurality of log entries and a respective plurality of first classification tags. The second classified test data set may include the second plurality of log entries and a respective plurality of second classification tags.

According to this aspect, the first plurality of log entries and the second plurality of log entries may be received from one or more client computing devices.

According to this aspect, the first plurality of log entries and the second plurality of log entries may indicate one or more user interactions performed with a first computing environment.

According to another aspect of the present disclosure, a method for use with a computing device is provided. The method may include receiving a training data set including a first plurality of log entries. Each log entry of the first plurality of log entries may be associated with a training tag indicating whether the log entry includes sensitive data. The method may further include training a sensitivity classification neural network using the training data set. The method may further include applying the sensitivity classification neural network to a test data set including a second plurality of log entries to obtain a first classified test data set. The method may further include applying a rule-based data sensitivity classification algorithm to the test data set to obtain a second classified test data set. Based on the first classified test data set and the second classified test data set, the method may further include modifying the sensitivity classification neural network to obtain a first modified sensitivity classification neural network.

According to this aspect, the method may further include classifying a runtime data set including one or more runtime log entries using the first modified sensitivity classification neural network to obtain a first classified runtime data set.

According to this aspect, applying the rule-based sensitivity classification algorithm to the one or more runtime log entries to obtain a second classified runtime data set. Based on the first classified runtime data set and the second classified runtime data set, the method may further include further modifying the first modified sensitivity classification neural network to obtain a second modified sensitivity classification neural network.

According to this aspect, the method may further include removing one or more runtime log entries classified as including sensitive data from the first classified runtime data set.

According to this aspect, the runtime data may be classified in response to receiving an instruction to move the runtime data set from a first computing environment to a second computing environment. The method may further include transferring the first classified runtime data set to the second computing environment subsequently to removing the one or more runtime log entries classified as including sensitive data.

According to this aspect, modifying the sensitivity classification neural network may include identifying one or more log entries of the test data set that are marked as including sensitive data in the second classified test data set but not in the first classified test data set.

According to this aspect, the sensitivity classification neural network is a deep neural network. Modifying the sensitivity classification neural network may include modifying at least one neuronal weight of the deep neural network.

According to this aspect, the method may further include receiving the first plurality of log entries and the second plurality of log entries from one or more client computing devices.

According to another aspect of the present disclosure, a computing device is provided, including a processor configured to receive a runtime data set including one or more runtime log entries. Using a sensitivity classification neural network, the processor may be further configured to classify the one or more runtime log entries according to whether the one or more runtime log entries include sensitive data. The sensitivity classification neural network may be trained using a training data set including a first plurality of log entries. Each log entry of the first plurality of log entries may be associated with a training tag indicating whether the log entry includes sensitive data. The sensitivity classification neural network may be tested using a test data set including a second plurality of log entries. The sensitivity classification neural network may be modified based on a difference between a first classified test data set classified by the sensitivity classification neural network and a second classified test data set classified by a rule-based sensitivity classification algorithm.

According to this aspect, the processor may be further configured to modify the runtime data set by removing one or more runtime log entries that include sensitive data. The processor may be further configured to transfer the modified runtime data set from a first computing environment to a second computing environment.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
  receive a runtime data set including one or more runtime entries;
  at a sensitivity classification neural network, compute a first classified runtime data set that indicates, for each of the one or more runtime entries, whether that runtime entry includes sensitive data;
  apply a rule-based sensitivity classification algorithm to each of the one or more runtime entries to obtain a second classified runtime data set;
  based at least in part on the first classified runtime data set and the second classified runtime data set, modify the sensitivity classification neural network to obtain a modified sensitivity classification neural network; and
  remove one or more runtime entries classified as including sensitive data from the first classified runtime data set.

2. The computing system of claim 1, wherein the one or more runtime entries are one or more runtime log entries that respectively indicate one or more user interactions with the computing system.

3. The computing system of claim 1, wherein the one or more runtime entries are received from one or more client computing devices.

4. The computing system of claim 1, wherein:
the processor is configured to classify the runtime data set in response to receiving an instruction to move the runtime data set from a first computing environment to a second computing environment; and
the processor is further configured to transfer the first classified runtime data set to the second computing environment subsequently to removing the one or more runtime entries classified as including sensitive data.

5. The computing system of claim 1, wherein the processor is configured to modify the sensitivity classification neural network at least in part by identifying one or more entries of the runtime data set that are marked as including sensitive data in the second classified runtime data set but not in the first classified runtime data set.

6. The computing system of claim 5, wherein:
the first classified runtime data set includes the plurality of runtime entries and a respective plurality of first classification tags; and
the second classified test data set includes the plurality of runtime entries and a respective plurality of second classification tags.

7. The computing system of claim 1, wherein the runtime data set includes unstructured data.

8. The computing system of claim 1, wherein, when the sensitivity classification neural network is modified, the processor is configured to further train the sensitivity classification neural network to identify sensitive data stored in one or more additional data formats.

9. The computing system of claim 1, wherein, prior to receiving the runtime data set, the processor is configured to train the sensitivity classification neural network at least in part by:
  receiving a training data set including a plurality of training entries, wherein each training entry of the plurality of training entries is associated with a training tag indicating whether the training entry includes sensitive data;
  training the sensitivity classification neural network using the training data set;
  applying the sensitivity classification neural network to a test data set including a plurality of test entries to obtain a first classified test data set;
  applying a rule-based data sensitivity classification algorithm to the test data set to obtain a second classified test data set; and
  based on the first classified test data set and the second classified test data set, performing further training at the sensitivity classification neural network.

10. The computing system of claim 9, wherein the training data set includes unstructured data.

11. A method for use with a computing system, the method comprising:
  receiving a runtime data set including one or more runtime entries;
  at a sensitivity classification neural network, computing a first classified runtime data set that indicates, for each of the one or more runtime entries, whether that runtime entry includes sensitive data;
  applying a rule-based sensitivity classification algorithm to each of the one or more runtime entries to obtain a second classified runtime data set;
  based at least in part on the first classified runtime data set and the second classified runtime data set, modifying the sensitivity classification neural network to obtain a modified sensitivity classification neural network; and
  removing one or more runtime entries classified as including sensitive data from the first classified runtime data set.

12. The method of claim 11, wherein the one or more runtime entries are one or more runtime log entries that respectively indicate one or more user interactions with the computing system.

13. The method of claim 11, wherein the one or more runtime entries are received from one or more client computing devices.

14. The method of claim 11, wherein:
the runtime data set is classified in response to receiving an instruction to move the runtime data set from a first computing environment to a second computing environment; and
the first classified runtime data set is transferred to the second computing environment subsequently to removing the one or more runtime entries classified as including sensitive data.

15. The method of claim 11, wherein the sensitivity classification neural network is modified at least in part by identifying one or more entries of the runtime data set that are marked as including sensitive data in the second classified runtime data set but not in the first classified runtime data set.

16. The method of claim 11, wherein the runtime data set includes unstructured data.

17. The method of claim 11, wherein, when the sensitivity classification neural network is modified, the sensitivity classification neural network is further trained to identify sensitive data stored in one or more additional data formats.

18. The method of claim 11, further comprising, prior to receiving the runtime data set, training the sensitivity classification neural network at least in part by:
   receiving a training data set including a plurality of training entries, wherein each training entry of the plurality of training entries is associated with a training tag indicating whether the training entry includes sensitive data;
   training the sensitivity classification neural network using the training data set;
   applying the sensitivity classification neural network to a test data set including a plurality of test entries to obtain a first classified test data set;
   applying a rule-based data sensitivity classification algorithm to the test data set to obtain a second classified test data set; and
   based on the first classified test data set and the second classified test data set, performing further training at the sensitivity classification neural network.

19. The method of claim 18, wherein the training data set includes unstructured data.

20. A computing system comprising:
a processor configured to:
   receive a runtime data set including one or more runtime entries;
   receive an instruction to move the runtime data set from a first computing environment to a second computing environment
   at a sensitivity classification neural network, compute a first classified runtime data set that indicates, for each of the one or more runtime entries, whether that runtime entry includes sensitive data;
   apply a rule-based sensitivity classification algorithm to each of the one or more runtime entries to obtain a second classified runtime data set;
   remove one or more runtime entries classified as including sensitive data, in the first classified runtime data set and/or the second classified runtime data set, from the first classified runtime data set; and
   transfer the first classified runtime data set to the second computing environment subsequently to removing the one or more runtime entries classified as including sensitive data.

\* \* \* \* \*